(12) United States Patent
Shechter et al.

(10) Patent No.: US 10,790,529 B2
(45) Date of Patent: Sep. 29, 2020

(54) OXYGEN REDUCTION CATALYST ELEMENT, METHOD OF ITS PRODUCTION, AND USES THEREOF

(71) Applicant: EMEFCY LTD., Caesarea (IL)

(72) Inventors: Ronen-Itzhak Shechter, Kiryat Tivon (IL); Yair Haim Wijsboom, Kiryat Ono (IL); Lior Eshed, Haifa (IL)

(73) Assignee: EMEFCY LTD., Caesarea (IL)

( * ) Notice: Subject to any disclaimer, the term of this patent is extended or adjusted under 35 U.S.C. 154(b) by 136 days.

(21) Appl. No.: 15/552,690

(22) PCT Filed: Feb. 23, 2016

(86) PCT No.: PCT/IL2016/050203
§ 371 (c)(1),
(2) Date: Aug. 22, 2017

(87) PCT Pub. No.: WO2016/135722
PCT Pub. Date: Sep. 1, 2016

(65) Prior Publication Data
US 2018/0048010 A1    Feb. 15, 2018

Related U.S. Application Data

(60) Provisional application No. 62/119,347, filed on Feb. 23, 2015.

(51) Int. Cl.
*H01M 8/16* (2006.01)
*H01M 8/0206* (2016.01)
(Continued)

(52) U.S. Cl.
CPC .......... *H01M 8/16* (2013.01); *H01M 8/0206* (2013.01); *H01M 8/1048* (2013.01); *C08F 14/22* (2013.01); *Y02E 60/527* (2013.01); *Y02P 70/56* (2015.11)

(58) Field of Classification Search
None
See application file for complete search history.

(56) References Cited

U.S. PATENT DOCUMENTS

2006/0199061 A1* 9/2006 Fiebig ................. H01M 4/8605
429/410
2008/0292912 A1* 11/2008 Logan ................. H01M 4/8878
429/2

(Continued)

FOREIGN PATENT DOCUMENTS

WO    2010/049936 A1    5/2010
WO    2012/081001 A1    6/2012

OTHER PUBLICATIONS

Rao et al., 2011, "Iron and Nitrogen Containing Carbon Catalysts with Enhanced Activity for Oxygen Reduction in Proton Exchange Membrane Fuel Cells", Open Journal of Physical Chemistry, 1, 11-22.

(Continued)

*Primary Examiner* — Scott J. Chmielecki
(74) *Attorney, Agent, or Firm* — Vorys, Sater, Seymour and Pease LLP

(57) ABSTRACT

Provided is an oxygen reduction catalyst element including a water impermeable, gas permeable membrane coated on at least one a portion thereof with a porous layer including a mixture of a non-ionic polymer and at least one oxygen reduction catalytic particulate material. Also provided herein is a method of producing the oxygen reduction catalyst element, a cathode including the same and a fuel cell making use of such cathode.

20 Claims, 6 Drawing Sheets

(51) Int. Cl.
*H01M 8/1048* (2016.01)
*C08F 14/22* (2006.01)

(56) References Cited

U.S. PATENT DOCUMENTS

| | | | | |
|---|---|---|---|---|
| 2012/0276418 | A1* | 11/2012 | Zhou | B09C 1/10 |
| | | | | 429/2 |
| 2013/0004798 | A1* | 1/2013 | Huang | H01M 8/16 |
| | | | | 429/2 |
| 2014/0037915 | A1* | 2/2014 | Rebouillat | B32B 7/14 |
| | | | | 428/198 |
| 2015/0030888 | A1* | 1/2015 | Popat | H01M 8/16 |
| | | | | 429/2 |
| 2015/0064501 | A1* | 3/2015 | Ren | H01M 8/16 |
| | | | | 429/2 |
| 2015/0349350 | A1* | 12/2015 | Liu | H01M 8/0239 |
| | | | | 429/2 |
| 2016/0301084 | A1* | 10/2016 | Gendel | C25D 13/02 |
| 2016/0326031 | A1* | 11/2016 | Amy | C02F 3/005 |

OTHER PUBLICATIONS

Yang et al., "Single-Step Fabrication Using a Phase Inversion Method of Poly(vinylidene fluoride) (PVDF) Activated Carbon Air Cathodes for Microbial Fuel Cells", Environmental Science Technology Letters 1:416-420 (2014).

\* cited by examiner

OXYGEN REDUCTION CATALYST ELEMENT, METHOD OF ITS PRODUCTION, AND USES THEREOF

TECHNOLOGICAL FIELD

The present disclosure is in the field of catalysts for electrochemical reactions, particularly for use in microbial fuel cells.

BACKGROUND ART

References considered to be relevant as background to the presently disclosed subject matter are listed below:
B. E. Logan et al. *"Single-Step Fabrication Using A Phase Inversion Method Of Polyvinylidene Fluoride (PVDF) Activated Carbon Air Cathodes For Microbial Fuel Cells"* Environmental Science Technology Letters 1:416-420 (2014).

Acknowledgement of the above references herein is not to be inferred as meaning that these are in any way relevant to the patentability of the presently disclosed subject matter.

BACKGROUND

In a microbial fuel cell (MFC), electricity is produced by electrogenic bacteria as part of its metabolism, mainly associated with oxidation of organic matter. MFCs can use wastewater as a fuel, or a diluted solution of organic materials in water, sometimes generalized to biodegradable electron donors.

A MFC has an anaerobic anode chamber and a cathode chamber. The anaerobic anode chamber is usually connected to the cathode chamber through an external wire that completes the electrical circuit.

Further, when using air cathodes, there is a need for catalysts to promote high oxygen reduction reaction activity in the MFC air cathode. Platinum catalysts for oxygen reduction are unsuitable for large scale applications due to their cost.

Activated carbon (AC) is another available catalyst and its fabrication requires the use of a compatible binder. Conventional fuel cells use ionic polymers, or ion exchange material, as binders or as part of the binder. Such polymers have the ionic conductivity properties required to enable the catalytic activity. Nation® is an example for a commercially available ionic polymer that was widely used in much of the research on this subject. However, ion exchange materials are rather expensive and tend to deteriorate due to swelling in aqueous conditions, such as in a MFC, due to their hydrophilic features.

B. E. Logan et al. describe the fabrication of an MFC cathode using polyvinylidene fluoride (PVDF) binder and an activated carbon catalyst using a phase inversion process. Specifically, the cathode fabrication was accomplished by spreading the AC/PVDF/Carbon Black (CB) mixture onto a stainless steel mesh, followed by immersion in water (for the phase inversion).

GENERAL DESCRIPTION

The present disclosure is aimed at providing a cathode that is an alternative to ion exchange-based cathodes.

Generally, the present disclosure is based on the development and utilization of a porous catalyst system that permits high level contact between electrolytes within an electrolytic solution, such as wastewater, and a conductor, rendering the combination of the porous catalyst and conductor applicable for both small scale and large-scale bacterial fuel cells.

More specifically, and in accordance with a first of its aspects, the present disclosure provides an oxygen reduction catalyst element comprising a water impermeable, gas permeable membrane coated on at least a portion thereof, e.g. on one face thereof with a porous layer comprising a mixture of a non-ionic polymer and at least one oxygen reduction catalytic particulate material.

Also provided by the present disclosure is a method of producing an oxygen reduction catalyst element, the method comprising:
a. mixing a non-ionic polymer with a at least one oxygen reduction catalytic particulate material to form a mixture;
b. dissolving said mixture in a solvent system comprising at least one organic solvent to form an ink;
c. applying said ink onto a water impermeable, gas permeable membrane to form an ink-coated membrane;
d. immersing the ink-coated membrane into a liquid carrier for a time sufficient to allow deposition coagulation of said ink onto said membrane;
e. removing said water.

The oxygen reduction catalyst element can have various applications. For example, the oxygen reduction catalyst element can be used as part of a cathode.

Thus, in accordance with a third of its aspects, the present disclosure provides a cathode comprising (a) a conductor; and (b) an oxygen reduction catalyst element superimposed over at least a portion of the conductor and comprising a water impermeable, gas permeable membrane coated with a porous layer comprising a mixture of a non-ionic polymer and at least one oxygen reduction catalytic particulate material.

The cathode can have several applications. In accordance with yet another aspect of the present disclosure, the cathode is used as part of a microbial fuel cell comprising:
(i) at least one cathode comprising:
  a. a conductor arranged to be electrically coupled across a load in an electrical circuit; and
  b. an oxygen reduction catalyst element superimposed over at least a portion of the conductor and comprising a water impermeable, gas permeable membrane coated with a porous layer comprising a mixture of a non-ionic polymer and at least one oxygen reduction catalytic particulate material;
(ii) at least one anode comprising a conductor arranged to be electrically coupled across a load in an electrical circuit, said anode being configured for biofilm growth thereon, said at least one cathode being separated from said at least one anode by at least one electronically insulating separator.

The anode optionally additionally comprising a current collector.

Finally, the present disclosure provides, in accordance with yet another aspect, a water treatment system comprising at least one microbial fuel cell as disclosed herein.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which.

DETAILED DESCRIPTION OF EMBODIMENTS

Figure 1:
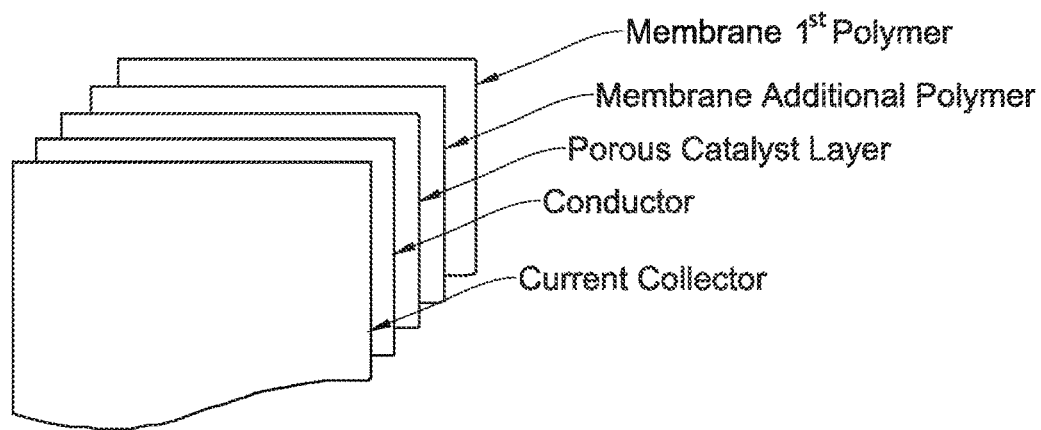
FIG. 1 is a simplified schematic illustration, in exploded view, of cathode assembly with the membrane layers according to an embodiment of the present disclosure.

In microbial fuel cells, a typical catalyst for the reaction on an anode is the biofilm developed on the anode and that generally oxidizes electron donors, releases protons and transfers electrons to the anode.

For catalysis on the cathode, the cathode can be modified with a catalytic element, such as a chemical catalyst.

Microbial fuel cells operate in electrolytic solutions, e.g. wastewater, and thus require catalyst elements (as well as other components of the installation) to have sufficient durability, strength, and humidity resistance, in order to prevent the catalyst from being eroded or washed out. In addition, should have high surface area and allow good contact between the conductor and the electrolytic solution.

Catalyst elements should also provide good contact between the catalyst, the conductor and the electrolytic solution.

With the above in mind, the inventors have developed a catalyst element comprising a water impermeable, gas permeable membrane coated on one side thereof (the side intended to face the wastewater in a microbial fuel cell) with a porous layer comprising a homogenous mixture of a non-ionic polymer and at least one oxygen reduction catalytic particulate material.

The membrane may be made from a variety of gas permeable and water impermeable polymers. It is generally formed of one or more non-conductive durable polymeric material, which is suitable to operate in aqueous operating conditions. For example, such polymeric material can be a water resistant polymer.

In some embodiments, the membrane comprises a polymer selected from a polyolefin and/or a polyester polymer.

In some embodiments, the membrane is a polymer selected from the group consisting of high density polyethylene (HDPE), low density polyethylene (LDPE), polypropylene, polyethylene terphtalate (PET), polydimethylsiloxane (PDMS), polymethylpentene (PMP), polyvinylidene fluoride (PVDF) and polysulfone. Specific examples of such polymers include: TPX, marketed by Mitsui Chemicals, Japan; PDMS (silicone rubber), marketed by Dow Corning, USA; Kynar (PVDF), marketed by Arkema, USA.

In some embodiments, the membrane comprises a woven or non-woven polyolefin. In some embodiments, the polyolefin comprises at least HDPE. In some embodiments the poly olefin comprises polypropylene.

In some embodiments, the membrane comprises polyester. In some embodiments, the polyester comprises at least polyethylene terphtalate (PET).

In some embodiments, the gas permeable water impermeable membrane is a multi-layered sheet. In this respect and in accordance with some embodiments, the membrane comprises a first polymeric sheet or layer that is laminated or co-extruded with one or more additional polymeric sheets or layers.

In some embodiments, the additional polymeric layer is applied onto one face of the first layer, preferably on the side facing the porous layer. The additional polymeric layer is applied in order to improve the selective permeability properties of the gas permeable water impermeable membrane. In some embodiments, the additional polymeric layer(s) are intended to substantially seal the first layer formed of the first polymer to passage of liquid with a small additional resistance to gas passage by diffusion therethrough.

The additional layer may vary in thickness. In some embodiments, the additional polymeric layer has a thickness in the range of between 5 and 25 µm.

In some embodiments, the one or more additional polymers comprises or is a polymer selected from the group consisting of, dialkylcopolymer, polymethylpentane, propylene-based elastomers (PBE), ethylene alpha olefin copolymers, PDMS (notably, PDMS can be used as the entire layer, or as a coating component only).

In some embodiments, the additional polymeric layer(s) comprises alkyl acrylate.

In some embodiments, the additional polymeric layer comprises or is methyl acrylate.

In some embodiments, the additional polymeric layer is used to coat a first polymeric sheet that is a polyolefin fabric, preferably a polyethylene fabric.

In some embodiments the additional polymeric layer is polymethyl pentene and is used to coat a first polymeric sheet formed of or comprising a polyester fabric, such as polyethylene terphtalate (PET) fabrics.

In some embodiments, the additional polymeric layer is co-extruded with the first polymeric layer.

In some embodiments, the gas permeable water impermeable membrane (comprising the first layer and optionally one or more additional layers) has a hydrostatic head of more than at least 100 cm $H_2O$ and tensile strength suitable to a roll to roll production process, for example of at least 10 N/cm.

The water impermeable, gas permeable membrane is coated or laminated with a porous layer comprising the chemical catalytic particulate material in a mixture with a non-ionic polymer. The porous layer is referred to herein, at times, as the "catalyst layer".

When the gas permeable water impermeable membrane is a multi-layered structure comprising the aforementioned an additional polymeric layer, the latter is sandwiched between the first polymeric layer/sheet and the porous catalyst layer.

In some embodiments the conductor is sandwiched between the first or the second/additional polymeric layer/sheet and the porous catalyst layer.

In some embodiments, the mixture of the catalytic particulate material and the non-ionic polymer is a homogenous mixture. In the context of the present disclosure when referring to a "homogenous mixture" it is to be understood as denoting an even distribution of the components of the mixture which can be viewed by any one of scanning electron microscopy (SEM), Scanning Electron Microscopy with X-ray microanalysis (SEM-EDX), X-ray diffraction (XRD) as known to those versed in the art.

The catalyst layer is porous and thus, upon use within an electrolytic solution is permeable to the electrolytes. The porosity is achieved, inter alia, by the use of a particulate catalyst material that provides a large surface area of the catalytic layer.

In some embodiments, the catalyst material comprises a catalyst metal entity. This can include any one of pure metals, metal alloys, metal oxides and organometalic compounds.

In some embodiments, the catalyst metal entity comprises an organometalic compound, i.e. a compound having at least one bond between a carbon atom of an organic compound, and an oxygen reducing metal. The oxygen reducing metal component in the organometallic compound is selected from Iron (Fe) or Cobalt (Co). In some embodiments, the organometallic material comprises clusters of the general formula MNxCy with M being selected from Fe or Co and x being preferably 4. These nitrogen containing organometallic clusters are also known as nitrified carbon metal complexes or pyrolyzed nitrogen doped carbon supported metal.

In yet some other embodiments, the catalyst material comprise graphene, e.g. graphene powder or nanopowder.

The catalyst material is a particulate matter that is homogenously mixed with the non-ionic polymer. Without being bound by theory, the non-ionic polymer acts as a binder for the particulate catalytic material to ensure stable and durable coating of the particulate catalytic material onto the water impermeable, gas permeable membrane.

In the context of the present disclosure, when referring to "particulate" material it is to be understood as encompassing various levels of granular materials (particles), from fine powder to granular. In some embodiments, the particulate catalyst material is a powder.

In some embodiments, the non-ionic polymer is a synthetic polymer.

In some embodiments, the non-ionic polymer comprises or is selected from polyvinyl chloride (PVC), polysulfone (PSU) and polyvinylidene difluoride (PVDF) or any combination of same.

In some embodiments, the non-ionic polymer comprises or is PVDF.

In some embodiments, the non-ionic polymer comprises or is PSU.

In some embodiments, the non-ionic polymer comprises or is PVC.

The catalyst layer can be characterized by its pores' dimensions. In some embodiments, the pores have a diameter of between n and m, each of n and m being, independently, a number between 0.1 µm to 10 µm and n<m.

In some embodiments, the catalyst porous layer comprises pores in the range of 0.1 µm to 10 µm, at times, between 0.5 µm and 5 µm, further at times, between 0.7 µm and 2.0 µm.

In some embodiments, the catalyst layer further comprises a conductivity enhancer, i.e. a substance that is mixed with the non-ionic polymer and the particulate catalyst material. Thus, the conductivity enhancer, when present in the catalyst element, constitutes an integral part of the porous catalyst layer.

In the context of the present disclosure a "conductivity enhancer" is to be understood as any substance (or combination of substances) that enhances conductivity of the catalyst layer. In some embodiments it is selected from powder, whiskers, fibers and combinations of the same of conducting materials.

In some embodiments, the conductivity enhancer comprises a carbon containing substance selected from the group consisting of graphite powder, graphite fibers, carbon black, activated carbon, graphite whiskers, carbon nano-tubes, each constituting a separate and independent embodiment of the present disclosure.

The oxygen reduction catalyst element disclosed herein can be prepared by various techniques. In some embodiments, the catalyst element is prepared by a method comprising:

a. mixing a non-ionic polymer with a at least one oxygen reduction catalyst particulate material to form a mixture;

b. mixing said mixture with a solvent system comprising at least one organic solvent to form an ink;

c. applying the ink onto a water impermeable, gas permeable membrane to obtain an ink-coated membrane;

d. immersing (dipping or soaking) the ink-coated membrane into a liquid carrier for a time sufficient to allow coagulation of the ink onto said membrane; and e. removing the liquid carrier to obtain the oxygen reduction catalyst element.

In the context of the present disclosure when referring to "coagulation" it is to be understood as the result of segregation of polar solvents from solution with a polymer material into water, thus causing separation of solids from the liquid, in the case of the present invention also resulting in the formation of a layer with a porous structure.

The non-ionic polymer and the catalytic particulate material are defined hereinabove.

At times, the non-ionic polymer and the catalytic particulate material are also mixed with a conductivity enhancer, the latter, also as defined herein above.

Preferably, the non-ionic polymer, catalytic particulate material and optionally the conductivity enhancer are mixed until a homogenous mixture is obtained. In some embodiments, the mixing is performed in a manner that would obtain a generally homogenous mixture that can be conducted in any conventional means such as mechanical stirrer. The mixing is at room (ambient) temperature.

In some embodiments, the components of this catalyst mixture are dry components, thereby providing a dry particulate mixture.

In some other embodiments, at least one component of the mixture, e.g. the polymer, is liquid or in the form of a paste, in which case a fluid mixture or a pasty mixture is obtained.

The amounts of the components in the mixture may vary. When the mixture is a dry mixture (i.e. all components are in dry form), the mixture comprises between 20% by weight to 65% by weight of the catalyst particulate material.

In some embodiments, the mixture comprises at least 30% by weight, at times at least 40% by weight or at least 50% by weight of the catalytic particulate material out of the total final weight of the mixture. In some embodiments, the mixture comprises at most 65% by weight, at times at most 50% by weight or at most 40% by weight of the catalytic particulate material out of the total final weight of the mixture.

In some embodiments, the dry mixture comprises between 15% by weight to 50% by weight of the non-ionic polymer out of the total final weight of the mixture.

In some embodiments, the mixture comprises at least 15% by weight, at times at least 25% by weight or at least 40% by weight of the non-ionic polymer out of the total final weight of the mixture. In some embodiments, the mixture comprises at most 50% by weight, at times at most 40% by weight or at most 30% by weight of the non-ionic polymer out of the total final weight of the mixture.

When the mixture comprises also a conductivity enhancer, the amount of the latter does not exceed 40% by weight out of the total mixture.

In some embodiments, the mixture comprises at least 10% by weight, at times, at least 20% or 30% of the conductivity enhancer. In some embodiments, the mixture comprise no more than 40% by weight, at times, no more than 30% or 20% by weight of the conductivity enhancer.

The following is a summary of possible ranges of components according to some embodiments of the present disclosure.

| Component in mixture | % by weight out of total dry mixture |
|---|---|
| Catalyst particulate material | 20%-65% |
| non-ionic polymer | 15%-50% |
| Conductivity enhancer | 10%-40% |

The mixture is then mixed with a solvent system. Mixing is performed in any commonly known manner until homogeneity of the mixture is achieved.

The solvent system comprises at least a primary solvent. The amount of primary solvent added at a polymer/solvent weight ratio of between 1:5 to 1:15. In some embodiments, the polymer/solvent system ratio is between 1:5 to 1:10, or between 1:5 to 1:7.

In some embodiments, the primary solvent is an organic polar solvent.

In some embodiments, the polar solvent is N-Methyl-2-pyrrolidone (NMP).

In some embodiments, the polar solvent is Dimethyl sulfoxide (DMSO).

In some embodiments, the polar solvent is Dimethylformamide (DMF).

In some embodiments, the polar solvent is or comprises any combination of the above organic solvents.

At times, the solvent system provides a thick paste. Thus, in order to be able to utilize the solvated mixture as ink, the solvent system also comprises a diluent. The diluent can be added together with the primary solvent or thereafter, i.e. as a secondary solvent. The diluent allows achieving a desired ink viscosity, namely, a viscosity that permits the application of the even distribution of the ink on the membrane. The amount of diluent will depend, inter alia, on the type of primary solvent, the type of diluent and the manner of applying the resulting ink onto the substrate. At times, the dilution is to a polymer:diluent ratio of 1:20, at times, 1:17, and further at times, 1:15 or 1:10.

The diluent is selected to be at least water or alcohol-soluble.

In some embodiments, the diluent is selected from any one or any combination of a ketone, ester, alcohol, alkyl acetate.

In some embodiments, the diluent is tetra hydro furane (THF).

In some embodiments, the diluent is Acetone.

In some embodiments, the diluent is 2-ethoxyethanol (Cellosolve).

The resulting diluted mixture has catalytic properties and thus can be used as ink for coating water impermeable, gas permeable membranes. Accordingly, the next step in the preparation of the oxygen reduction catalyst element comprises applying said ink onto a water impermeable, gas permeable membrane. The application of the ink can be by any means known in the art including spreading, brushing, spraying etc. For example, spreading can be achieved by a commercially available rod applicator.

The application of the ink is such that a thin layer is obtained. The thickness of the layer is in the range of 100 µm to 1,000 µm, at times, between 100 µm to 600 µm, at times, 300±100 µm.

The ink is applied onto at least a portion of one face (surface) of a substrate, i.e. the water impermeable, gas permeable membrane.

Once the ink is applied onto the surface of the membrane, the membrane (with the ink thereon) is immersed into a liquid carrier for a time sufficient to allow coagulation of the ink onto the surface of the membrane of said ink onto the surface of the membrane.

Without being bound by theory, the liquid carrier is to be selected such that it would permit extraction of the solvent system of a solvent and diluent, thus, causing phase inversion of the ink's solvent system (solvent and diluent) whereby the non-ionic polymer and particulate catalytic material coagulate on the membrane to form a thin porous layer thereon comprising the catalytic material.

In some embodiments, the liquid carrier is a polar solvent or a combination of polar solvents.

In some embodiments the liquid carrier comprises water and/or alcohol, or combination of same.

In some embodiments the liquid carrier is water.

The result of immersing the coated membrane into water is known as phase inversion where the solvent system, including the primary solvent and the diluent is dissolved in the water, causing the coagulation of the particulate matter on the membrane, and the formation of the thin porous catalysis layer on the membrane.

The immersion time may vary depending, inter alia, on the type of solvent/diluent in the solvent system and the type of liquid carrier. In some embodiments, e.g. when the liquid carrier is water, it is sufficient to immerse the coated membrane in the liquid carrier for 30 seconds. A person versed in the art will know how to determine the end of the immersion time, for example, when the layer becomes structurally stable.

The liquid carrier is then dried out of the membrane. Drying can be by any technique known in the art, including, for example, air drying (blowing heated air onto the membrane), oven dry etc. When drying using heat, the temperature is dictated by the phase transition temperatures of the components in the element, namely, the phase transition temperatures of the membrane, of the non-ionic polymer(s), the particulate catalytic material so as to ensure that no physical or chemical modification or damage is caused to these components by the drying action.

Once dry, the catalyst element is ready for use.

The conductivity of the water, or electrolyte solution, that penetrate through the pores of the catalytic layer during operation of the MFC, provides the ionic conductivity as an alternative to an ion exchange material, which is used in conventional MFC systems.

Figure 6:
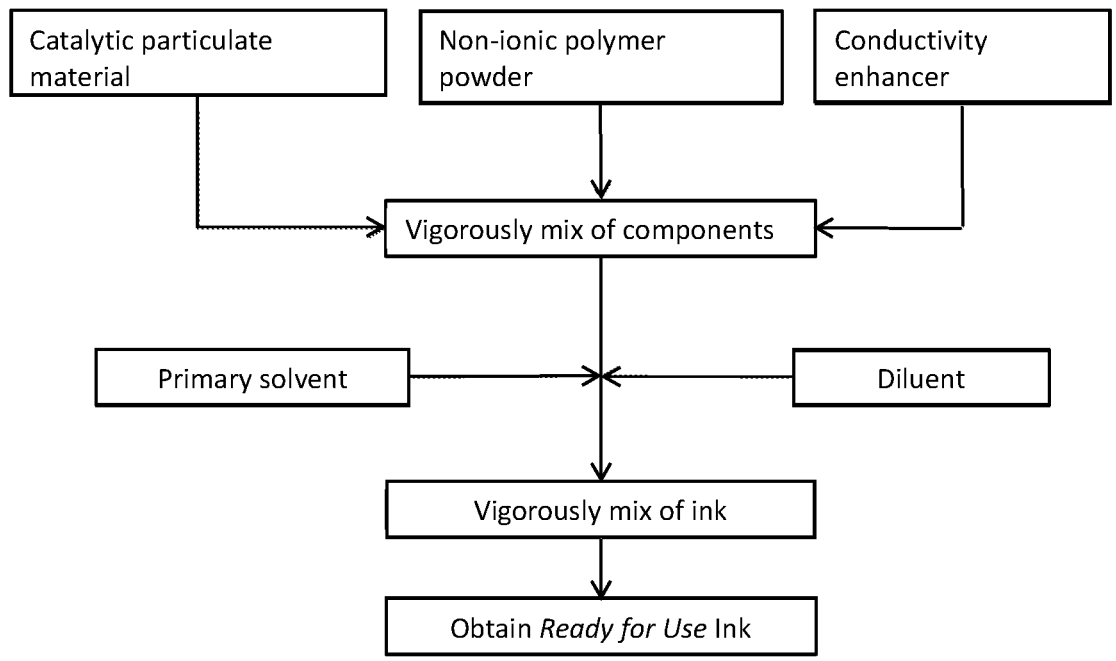
FIG. 6 is a scheme showing Preparation of Ready for Use ink.
Figure 7:
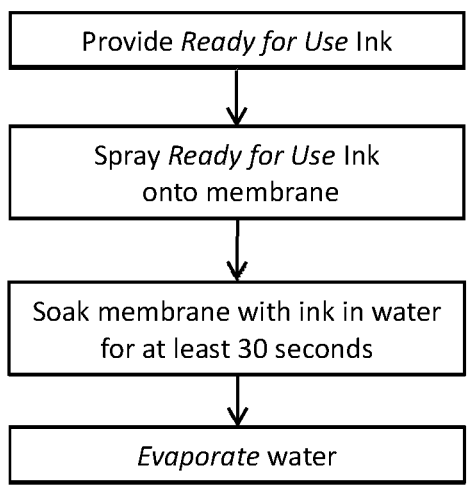
FIG. 7 is a scheme showing Application of the Ready for Use ink onto substrate.

Provided in FIGS. 6 and 7 are general Schemes for the preparation of the ink (FIG. 6), and for the application of the ink onto a substrate (e.g. membrane, FIG. 7), in accordance with some embodiments of the present disclosure.

The resulting ink coated membrane, namely, the oxygen reduction catalyst element, can be used in the formation of a cathode.

In this respect, there is thus also disclosed herein a cathode comprising a conductor and an oxygen reduction catalyst element as disclosed herein, the catalyst element being superimposed over at least a portion of the conductor.

In some embodiments, the conductor is carbon based. According to this embodiment, the conductor comprises or is selected from woven or non-woven carbon cloth (fabric), carbon felt, carbon veil, carbon plates and conductive plastic.

In some embodiment, the conductor is metal based. According to this embodiment, the conductor comprises or is selected from metal screen, metal mesh, conductive plastic coated metal.

In some embodiments, the conductor is as described in WO 2010/049936, the content of which is incorporated herein by reference.

The catalyst element and the conductor are physically attached (fixed) to each other. In some embodiments, the fixation between the two is achieved by pressing the two together.

In some embodiments, the conductor is attached to the coated membrane before soaking the coated membrane in the liquid carrier, such that during soaking and drying of the membrane, the two components are fixed to each other.

In some embodiments, the cathode also comprises a current collector that is in physical contact with the conductor.

The current collector comprises a metal electrical conducting material selected from the group consisting of copper, copper alloy, aluminum and aluminum alloy, the metal electrical material being insulated within an insulating material, such as insulating plastic.

FIG. 1 provides a schematic illustration of a cathode according to an embodiment of the present invention. As shown, the cathode comprises a membrane layer composed of fibers of a $1^{st}$ polymer, e.g. high density polyethylene and an additional polymer overlaying the first polymer. The combination of the first polymer and the additional polymer can be obtained by extrusion coating, chemical lamination or heat lamination.

On the other side of the additional layer, there is schematically illustrated a catalyst layer comprising the layer of the porous catalytic polymer (comprising the catalytic particulate material, the non-ionic polymer, and if added, the conductivity enhancer). The catalyst layer is preferably but not necessarily sandwiched between the membrane layer and a conductor, the latter being associated with a current collector.

In some embodiments the conductor is sandwiched between the first or the second/additional polymeric layer/sheet and the porous catalyst layer.

The cathode disclosed herein can be used in microbial fuel cells. In this respect, the present disclosure thus also provides a microbial fuel cell comprising:
at least one cathode comprising:
a conductor arranged to be electrically coupled through a current collector across a load in an electrical circuit;
an oxygen reduction catalyst element as defined herein, the catalyst element being superimposed over at least a portion of the cathode;
at least one anode comprising a conductor, and optionally a current collector arranged to be electrically coupled across a load in an electrical circuit, and configured for biofilm growth thereon,
the at least one cathode being separated from said at least one anode by at least one electrically insulating separator.

In some embodiments, spacers are used between the anode and cathode to permit passage of water containing dissolved materials and thereby biologically oxidation thereof.

Figure 2:
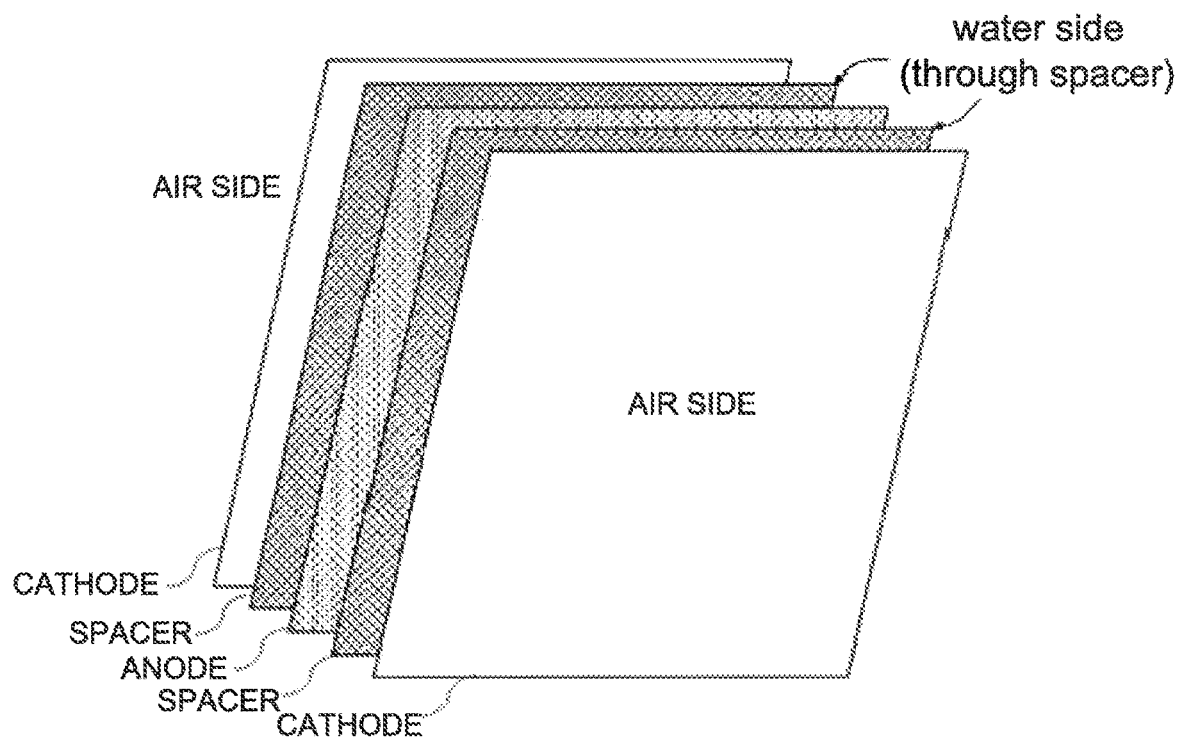
FIG. 2 is a simplified schematic illustration, in exploded view, of layers of a microbial fuel cell in accordance with an embodiment of the present disclosure.

A schematic illustration of an arrangement of two cathodes, an anode, and spacers therebetween is illustrated in FIG. 2 (exploded view of the different layers). Specifically shown are the two cathodes, each having an air facing side and a water facing side, the water facing sides of the two cathodes defining a water treatment zone. Within the water treatment zone is also included the anode being separated from the two cathodes by respective spacers.

Finally, the present disclosure also provides a water treatment system comprising at least one fuel cell as described above.

In some embodiments, the water treatment system comprises a single fuel cell comprising one or more cathodes disclosed herein.

In some embodiments, the water treatment system comprises a plurality of fuel cells, each comprising one or more cathodes disclosed herein.

DESCRIPTION OF NON-LIMITING EMBODIMENTS

Preparation of Catalyst Ink

The porous catalyst coating is made in a form of an ink to be applied onto a conductive element. The ink comprises a mixture of a non-ionic polymer and at least one oxygen reduction catalytic particulate material and is prepared as follows:

A dry mixture comprising 45% by weight of nitrified carbon metal complex catalyst and 30 wt % of PVDF and an amount of 25% by weight of carbon black as the conductivity enhancer.

The dry mixture was then solvated in N-Methyl-2-pyrrolidone (NMP) at a 0.58 gr/ml concentration, and stirred until a thick homogenous paste was received.

The thick paste was then further diluted in ethyl acetate to form an ink.

The ink was applied a gas permeable membrane made of an alkyl acrylate coated non-woven PE fabric. Application was performed by a rod applicator to form a thin layer of about 200 μm ink. The ink coated membrane was then soaked in water for a period of 60 seconds to allow the solvent to dissolve into the water, thus creating a structurally stable porous coating layer on the membrane.

Then, the membrane coated by the porous catalytic layer was dried in air at room temperature. A carbon cloth was then pressed to the coated membrane to form a cathode assembly.

For the purpose of characterization the above prepared ink was applied onto a glassy carbon electrode that provides a much easier peeling of the element therefrom. Specifically, the porous catalytic layer was produced by dipping a 3 mm diameter glassy carbon electrode in the above mentioned ink composition. The coated electrode was then soaked in water and dried to form the porous catalytic layer, as explained above. The dry porous catalyst layer, of about 200 μm thickness, was then peeled off of the glassy carbon electrode. The porous catalytic layer peel was then scanned and photographed with a scanning electron microscope (SEM) in various angles and enlargements.

Preparation of Reference Cathode

For comparison, a reference cathode was prepared using a conventional ion exchange Nation® binder catalyst system loaded with 75% by weight of the same nitrified carbon metal complex catalyst mixed with Nafion® 20% solution and isopropanol as a diluent. The Nation® based catalyst layer was applied on a carbon cloth air cathode.

Characterization of Catalyst Ink

The peeled porous catalytic layer was characterized using scanning microscope electron (SEM). as shown in FIG. 3 and FIGS. 4A-4F.

Figure 3:
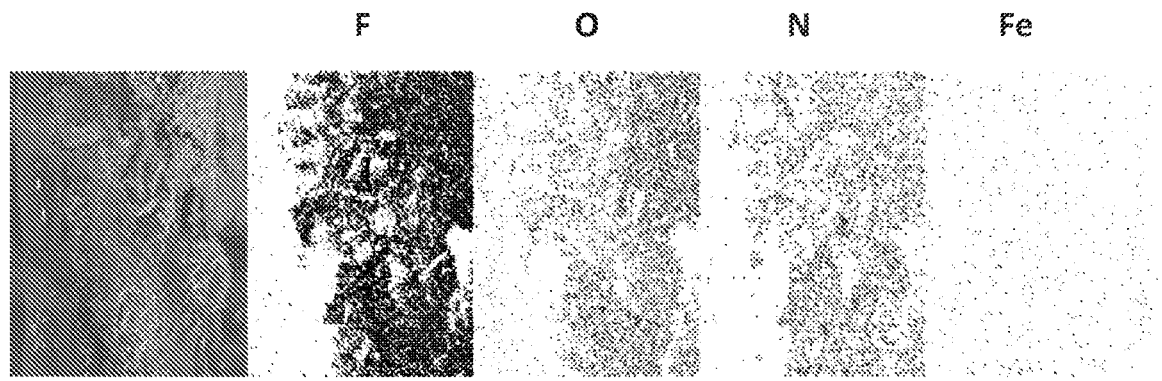
FIG. 3 is a scanning electron microscope-X ray microanalysis providing the mapping of elements in a catalyst element in accordance with an embodiment of the present disclosure.

FIG. 3 shows the mapping of elements (F, O, N, Fe) using SEM in a 493× magnification with X-ray microanalysis and is evident to the even distribution of the different elements in the scanned layer (left side image).

Figure 4A:
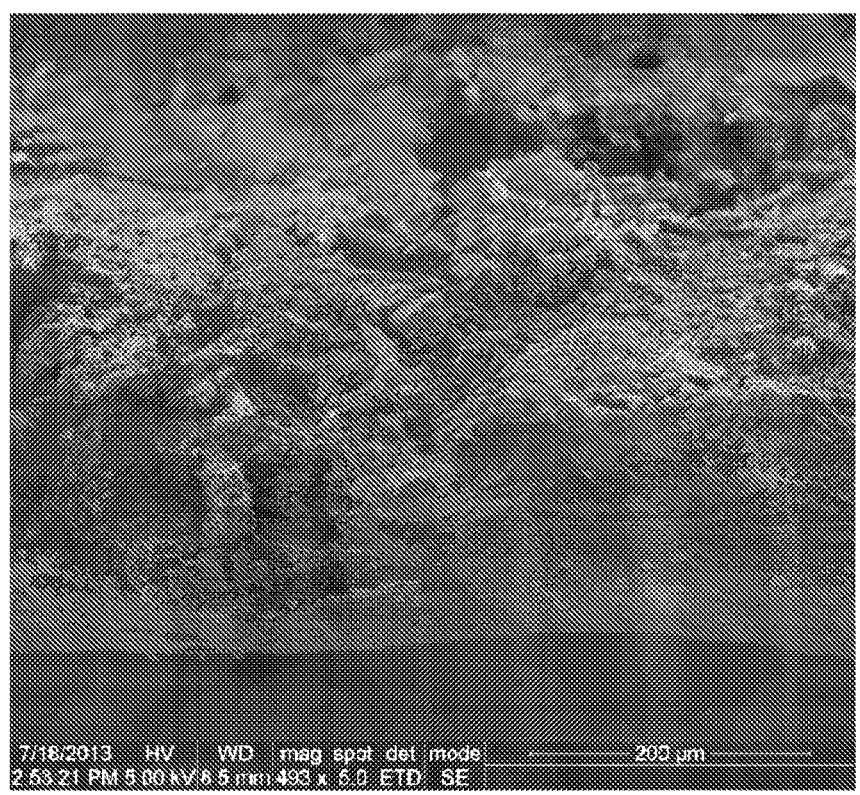
FIGS. 4A-4F are scanning electron microscope images from different views of a catalyst element in accordance with an embodiment of the present disclosure.
Figure 4B:
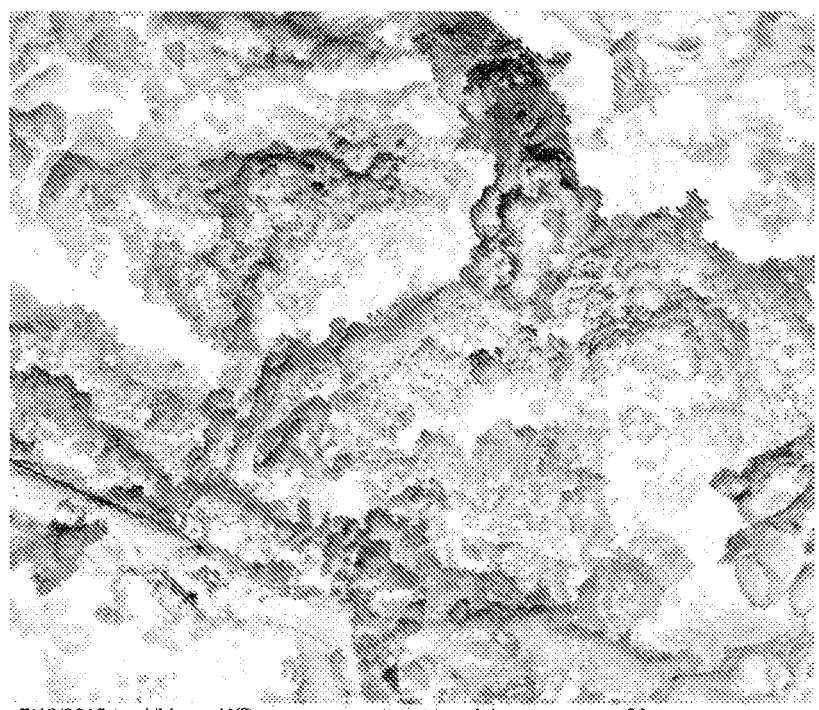
Figure 4C:
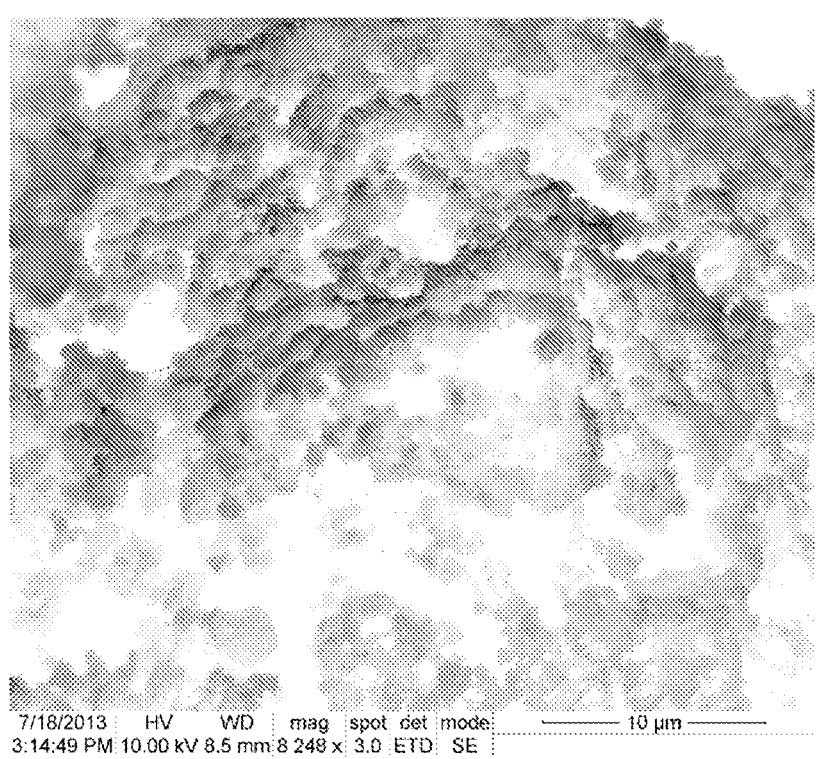
Figure 4D:
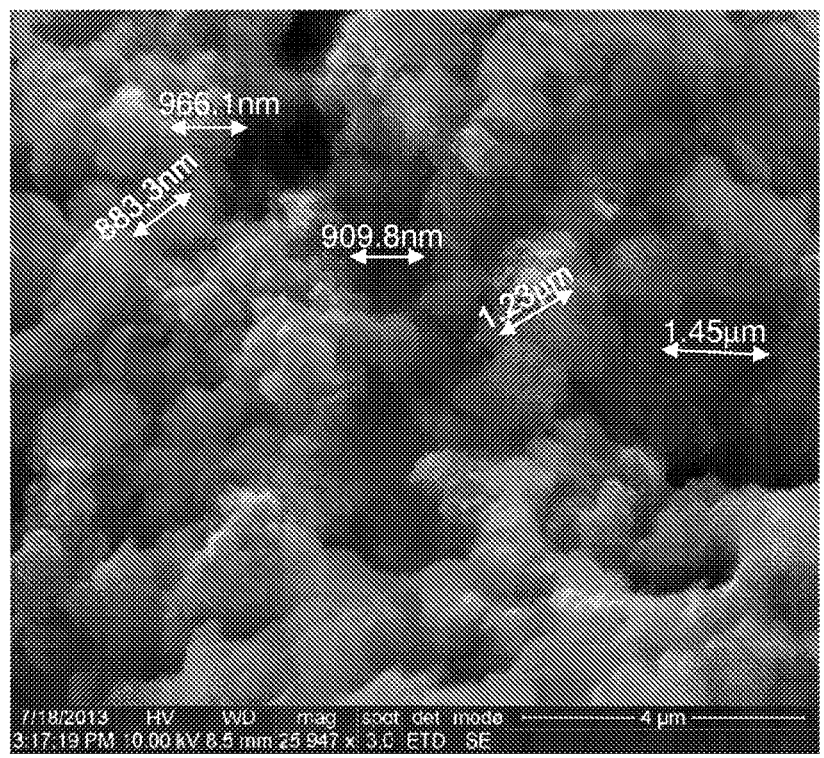

FIGS. 4A-4F show SEM microghraphs of the same peeled layer from different views and different magnifications. Specifically, FIG. 4A shows a cross section of the porous catalytic layer in a 493× magnification. FIGS. 4B and 4C show the topography of a first end (the one facing the water) of the porous catalytic layer viewed (seen as a structure coagulant), in two magnifications, 2,351× and 8,248× magnifications, respectively. FIG. 4D shows the size of the pores, measured in SEM enlargement of 25,947× magnification. As shown, the pores (black areas) are in the range of between a little less than 1 micron (883.3 nm, 909.8 nm, 966.1 nm) to a little more than 1 micron (1.23 µm, 1.45 µm).

Figure 4E:
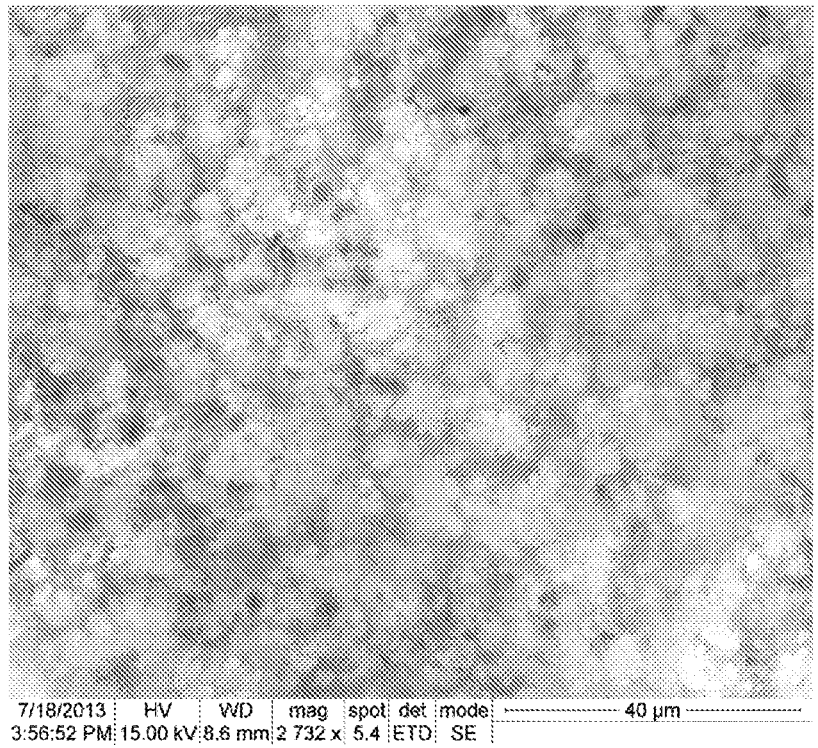
Figure 4F:
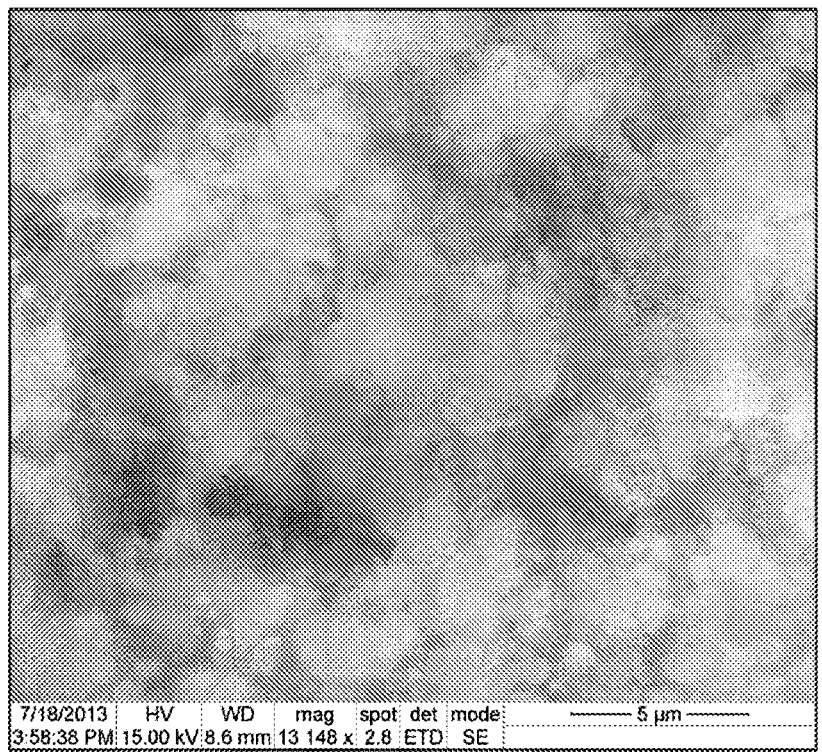

FIGS. 4E and 4F show the second end of the porous catalytic layer, i.e. the side facing and in contact with the surface of the electrode, in 2,732× and 13,148× magnifications, respectively.

It can be seen that the pores are formed all the way through the peeled layer allowing passageway from the water facing surface to the depth of the catalyst layer.

Comparative Analysis

Figure 5:
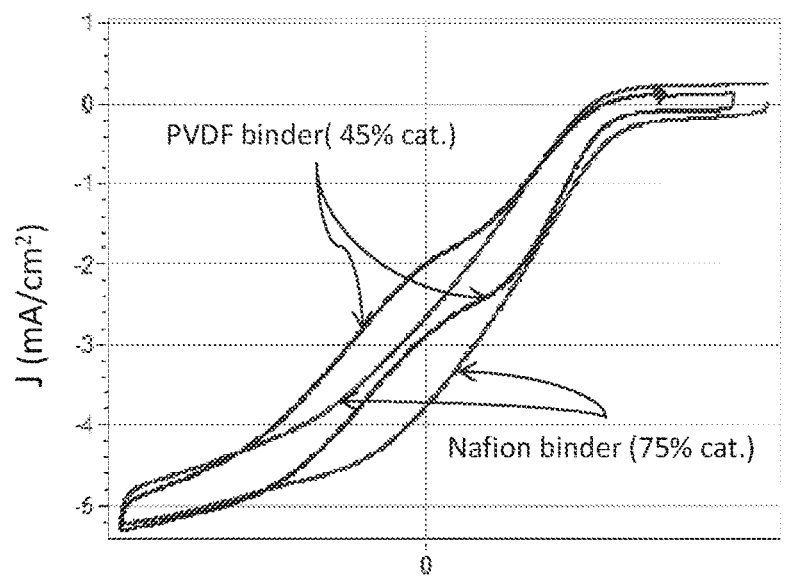
FIG. 5 is a graph showing the current density J (mA/cm$^2$) from a cathode assembled with a catalyst element in accordance with an embodiment of the present disclosure and a reference cathode that is assembled using Nafion as a binder.

The electrical performance of the cathode assembly disclosed herein was compared to the performance of the reference cathode. Specifically, a comparative cyclic voltammetry (CV) analysis was conducted in a laboratory scale 70 ml fuel cell with 0.5M phosphate buffer solution as the liquid medium and a stainless steel counter electrode. Electrical circuit was assembled with each cathode, and air was pumped into the fuel cell solution for 20 minutes. Then current density was measured by a potentiostat. The results, demonstrated in the diagram of FIG. 5, show that the current density in units of $mA/cm^2$ observed for the cathode assembly of the present invention was similar to the current density of the reference cathode at similar conditions.

The invention claimed is:

1. An oxygen reduction catalyst element comprising a water impermeable, gas permeable membrane coated on at least one side thereof with a porous layer comprising a mixture of a non-ionic polymer and at least one oxygen reduction catalytic particulate material.

2. The catalyst element of claim 1, wherein said non-ionic polymer comprises a polymer selected from the group consisting of: polyvinyl chloride (PVC), polyvinylidene difluoride (PVDF), polysulfone (PSU), and any combination thereof.

3. The catalyst element of claim 1, wherein said oxygen reduction catalytic particulate material comprises a metal entity in a form selected from pure metal, metal alloy, metal oxide and organometalic material.

4. An oxygen reduction catalyst element comprising:
  a water impermeable, gas permeable membrane;
  a porous catalyst layer comprising a mixture of a non-ionic polymer and at least one oxygen reduction catalytic particulate material,
  a porous conductor layer comprising a member selected from the group consisting of carbon cloth, metal screen, metal mesh, and conductive plastic coated metal; and
  a current collector layer;
  wherein the water impermeable, gas permeable membrane has opposed first and second sides;
  wherein the porous catalyst layer is coated on the second side of the water impermeable, gas permeable membrane to have a first side of the porous catalyst layer directly on the second side of the water impermeable, gas permeable membrane, wherein the porous catalyst layer is between the water impermeable, gas permeable membrane and the porous conductor layer;
  wherein the porous conductor layer has opposed first and second sides, wherein the first side of the porous conductor layer is directly on the second side of the porous catalyst layer to be in physical contact with the porous catalyst layer, and wherein the porous conductor layer is between the porous catalyst layer and the current collector layer;
  wherein the current collector layer has opposed first and second sides, wherein the first side of the current collector layer is directly on the second side of the porous conductor layer to be in physical contact with the porous conductor layer;
  whereby the water impermeable, gas permeable membrane second side having the porous catalyst layer coated is intended to face wastewater or a diluted solution of organic materials in water, and the water impermeable, gas permeable membrane first side is intended to face air.

5. The catalyst element of claim 1, comprising a conductivity enhancer selected from the group consisting of graphite powder, graphite fibers, carbon black, activated carbon, graphite whiskers, carbon nano-tubes and combination of same.

6. The catalyst element of claim 1, wherein said conductivity enhancer comprises activated carbon cloth.

7. The catalyst element of claim 1, wherein said porous layer comprises pores in the range between 0.1 µm and 10 µm.

8. The catalyst element of claim 1, wherein the water impermeable and gas permeable membrane comprises a polymer selected from the group consisting of polyolefin and/or a polyester polymer.

9. The catalyst element of claim 1, wherein said water impermeable, gas permeable membrane is coated with at least one additional polymer selected from the group consisting of alkylacrylate, dialkyl copolymers, polymethylpentene, polydimethylsiloxane (PDMS) propylene-based elastomers (PBE) and ethylene alpha olefin copolymers.

10. A method of producing an oxygen reduction catalyst element of claim 1, the method comprises:
  a. mixing a non-ionic polymer with an at least one oxygen reduction catalytic particulate material to form a mixture;
  b. mixing said mixture with a solvent system comprising at least one organic solvent to form an ink;
  c. applying said ink onto a water impermeable, gas permeable membrane to form a coated membrane;
  d. immersing the ink-coated membrane into a liquid carrier for a time sufficient to allow coagulation of said ink on said membrane;
  e. removing said liquid carrier.

11. The method of claim 10, wherein the solvent system comprises a primary solvent and a diluent being mixed with the mixture simultaneously or sequentially.

12. The method of claim 10, wherein the weight ratio between the non-ionic polymer to said primary solvent is in the range of 1:5 to 1:10.

13. The method of claim 10, comprising mixing said non-ionic polymer and said at least one oxygen reduction catalytic particulate material with a conductivity enhancer.

14. The method of claim 13, wherein the amount of said conductivity enhancer out of the total mixture is at most 50% w/w.

15. A cathode comprising:

(a) conductor; and (b) an oxygen reduction catalyst element superimposed over at least a portion of the conductor, said oxygen reduction catalyst element comprising a water impermeable, gas permeable membrane coated on at least one side thereof with a porous layer comprising a mixture of a non-ionic polymer and at least one oxygen reduction catalytic particulate material.

16. The cathode of claim 15, wherein said conductor comprises a cloth selected from woven and non-woven carbon cloth, carbon felt, carbon veil, carbon plates, metal screen or mesh, conductive plastic, conductive plastic coated metal.

17. The cathode of claim 15, comprising a current collector.

18. The cathode of claim 17, wherein said current collector comprises a metal electrical conductor selected from the group consisting of copper, copper alloy, aluminum and aluminum alloy.

19. A microbial fuel cell comprising:

at least one cathode comprising:

an oxygen reduction catalyst element comprising a water impermeable, gas permeable membrane coated on at least one side thereof with a porous layer comprising a mixture of a non-ionic polymer and at least one oxygen reduction catalytic particulate material;

a conductor having one face superimposed over at least one side of said porous layer and arranged to be electrically coupled across a load in an electrical circuit;

at least one anode comprising a conductor and optionally a current collector arranged to be electrically coupled across a load in an electrical circuit, said anode being configured for biofilm growth thereon, said at least one cathode being separated from said at least one anode by at least one electronically insulating separator.

20. A water treatment system comprising at least one fuel cell of claim 19.

* * * * *